United States Patent
Sakamoto (10) Patent No.: US 8,773,682 B2
(45) Date of Patent: Jul. 8, 2014

(54) IMAGE FORMING SYSTEM, IMAGE FORMING APPARATUS, AND INFORMATION PROCESSING DEVICE

(75) Inventor: Kana Sakamoto, Iizuka (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 182 days.

(21) Appl. No.: 13/433,752

(22) Filed: Mar. 29, 2012

(65) Prior Publication Data

US 2012/0250070 A1  Oct. 4, 2012

(30) Foreign Application Priority Data

Mar. 29, 2011 (JP) ................................ 2011-072487

(51) Int. Cl.
*G06K 15/02* (2006.01)

(52) U.S. Cl.
USPC ......... 358/1.14; 358/1.1; 358/1.12; 358/1.15; 709/203; 709/220

(58) Field of Classification Search
None
See application file for complete search history.

(56) References Cited

U.S. PATENT DOCUMENTS

| | | | | |
|---|---|---|---|---|
| 6,529,286 B1 * | 3/2003 | King | ............................ | 358/1.14 |
| 7,587,463 B2 * | 9/2009 | Sugita | ........................... | 709/208 |
| 8,503,006 B2 * | 8/2013 | Kondo | ........................... | 358/1.15 |
| 2002/0051136 A1 * | 5/2002 | Kawamura et al. | ............ | 358/1.1 |
| 2006/0007469 A1 * | 1/2006 | Uruma | ......................... | 358/1.14 |
| 2006/0026474 A1 | 2/2006 | Honda | | |

FOREIGN PATENT DOCUMENTS

| | | |
|---|---|---|
| JP | 07-297826 | 11/1995 |
| JP | 07-309054 | 11/1995 |
| JP | 2000-177216 | 6/2000 |
| JP | 2002-067455 | 3/2002 |
| JP | 2006-039963 | 2/2006 |
| JP | 2007-304937 | 11/2007 |

\* cited by examiner

*Primary Examiner* — Ashish K Thomas (74) *Attorney, Agent, or Firm* — Banner & Witcoff, Ltd.

(57) ABSTRACT

An image forming system may include an image forming apparatus, an information processing device configured to send print data to the image forming apparatus, and a destination device configured to receive error information sent from the image forming apparatus. The image forming apparatus may include a control device configured to determine whether the destination device is available to provide notification of the error information. The control device may be further configured to enforce print restriction controls to start the printing operation of the print data received from the information processing device when the destination device is available to provide notification of the error information and to not start the printing operation of the print data when the destination device is not available to provide notification of the error information.

19 Claims, 9 Drawing Sheets

IMAGE FORMING SYSTEM, IMAGE FORMING APPARATUS, AND INFORMATION PROCESSING DEVICE

CROSS REFERENCE TO RELATED APPLICATION

This application claims priority from Japanese Patent Application No. 2011-072487, filed on Mar. 29, 2011, which is incorporated herein by reference.

BACKGROUND

1. Technical Field

Aspects of the disclosure relate to an image forming system, an image forming apparatus and an information processing device for printing print data. More specifically, aspects herein relate to an image forming system, an image forming apparatus and an information processing device for notifying error information.

2. Description of Related Art

In a known image forming apparatus, e.g., a printer, various errors, e.g., paper jam, paper out, or colorant shortage, that may abort an image forming operation may occur. When such an error occurs, for example, the known image forming apparatus displays a notice of error occurrence or a recovery procedure for the error on a display unit, e.g., a liquid crystal display ("LCD"), of the known image forming apparatus.

In another known image forming apparatus, which does not have a text displaying function, e.g., which does not include an LCD, details of errors are indicated by various combinations of, blinking on and off of light-emitting diodes (LEDs). In a known image forming system, for example, when an error occurs, LEDs are operated to emit light with an emission pattern corresponding to the error. A local computer used by a user is equipped with software in which the user can input the emission pattern of the LEDs of a printer. By using the software, the emission pattern of the LEDs is reproduced on the local computer by a user's input operation. Then, the local computer displays error information corresponding to the emission pattern inputted by the user.

SUMMARY

In some examples, when the user is located at a distance from the image forming apparatus, the user may not notice the error information that is indicated on the image forming apparatus using the LCD or using the LEDs. Additionally, when the user's local computer is not available to receive or display error information, the user may not notice a receipt of the error information immediately even though the image forming apparatus sends the error information to the local computer. When a print error occurs under this condition, more time may be required for the user to notice and resolve the error. As a result, productivity of the image forming apparatus may be decreased.

One or more aspects of the disclosure provide for an image forming system, an image forming apparatus and an information processing device, which may maintain productivity when an error occurs.

One or more aspects of the disclosure relate to an image forming system which may include an image forming apparatus, an information processing device configured to send print data to the image forming apparatus, and a destination device configured to receive error information sent from the image forming apparatus. In one example, the image forming apparatus may include a control device configured to determine whether the destination device is available to receive or provide notification of the error information. The control device may be further configured to perform a print restriction control process that starts the printing operation of the print data received from the information processing device when the destination device is available to receive or provide notification of the error information and does not start or prevents starting the printing operation when the destination device is not available to receive or provide notification of the error information.

Further, one or more aspects of the disclosure relates to an image forming apparatus which may include a receiving unit configured to receive print data, a sending unit configured to send error information to a destination device, and a control device configured to determine whether the destination device is available to receive or provide notification of the error information. The control device may be further configured to perform a print restriction control process that starts the printing operation of the print data received from the information processing device when the destination device is available to receive or provide notification of the error information and does not start or prevents the printing operation when the destination device is not available to receive or provide notification of the error information.

Also, one of more aspects of the disclosure relate to an information processing device which may include a processor or controller such as a CPU configured to receive error information sent from an image forming apparatus, run a notification application that notifies a user of the error information, generate print data associated with running information indicating a running status of the notification application, and send the print data to the image forming apparatus.

According to yet another aspect, the information processing device may send the print data to the image forming apparatus. In the image forming apparatus, the control device may determine whether the destination device is available to provide or receive notification of the error information. The error information may include at least one of details of an error and a recovery procedure for the error. Moreover, the information processing device configured to send the print data and the destination device configured to receive the error information may be different devices or may be the same device. In the image forming apparatus, the control device may perform the print restriction control process to determine whether the printing operation of the received print data is started. In one example, the control device may control the print restriction control process to start the printing operation of the print data received from the information processing device when the destination device is available to receive or provide notification of the error information and to prevent or not start the printing operation of the print data when the destination device is not available to receive or provide notification of the error information.

That is, in the image forming system, the printing operation may be started on condition that the destination device is available to receive and/or provide notification to a user of the error information. With this configuration, when an error occurs, the error information may be notified to the user with more certainty, thereby reducing the risk of being unnoticed by the user. As a result, the image forming apparatus may recover from the error immediately and maintain productivity when an error occurs.

Other aspects, features, and advantages will be apparent to persons of ordinary skill in the art from the following detailed description and the accompanying drawings.

BRIEF DESCRIPTION OF THE DRAWINGS

For a more complete understanding of the present disclosure, needs satisfied thereby, and the objects, features.

DETAILED DESCRIPTION

Embodiments in which an image forming system according to one or more aspects of the disclosure may be implemented are now described in detail with reference to the accompanying drawings, like numerals being used for like corresponding parts in the various drawings. In the embodiments, the aspects of the disclosure may be applied to an image forming system comprising a printer, e.g., image forming apparatus, and a computer such as a personal computer ("PC") configured to send print data to the printer.

It is noted that various connections are set forth between elements in the following description. It is noted that these connections are general and, unless specified otherwise, may be direct or indirect and that this specification is not intended to be limiting.

Figure 1:
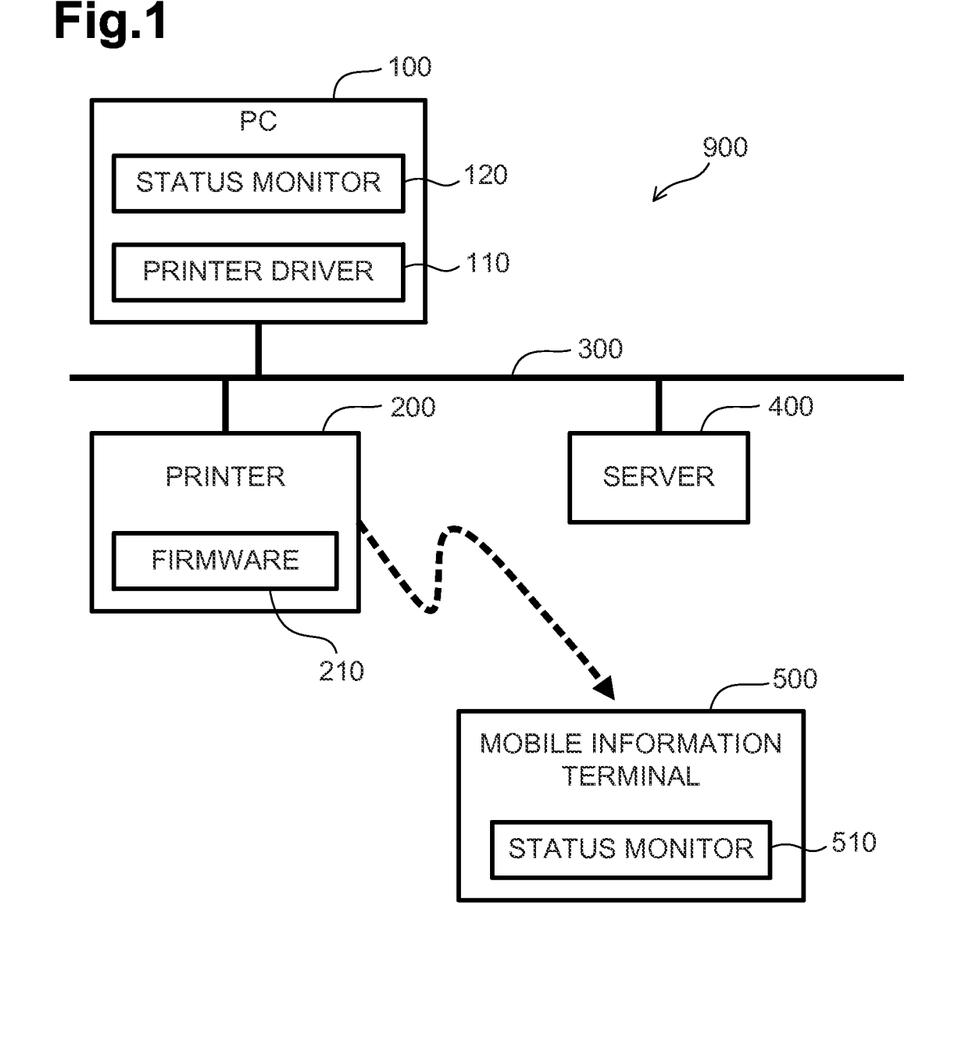
FIG. 1 is a block diagram depicting an example image forming system in a first embodiment according to one or more aspects of the disclosure.

A first embodiment according to one or more aspects of the disclosure is described below. As depicted in FIG. 1, an image forming system 900 may comprise a computer such as PC 100, a printer 200, and a server 400. PC 100 may be configured to generate print data and output the generated print data. Printer 200 may have a printing function. In image forming system 900, PC 100, printer 200, and sever 400 may be connected with each other through a network 300, e.g., Ethernet.

The PC 100 (an example of an information processing device and/or a destination device) may be equipped with a printer driver 110, a status monitor 120, and various application programs having a printing instructing function. Printer driver 110 may be configured to generate print data corresponding to printer 200. Status monitor 120 may be configured to indicate an operating status of printer 200. Printer driver 110 may be configured to generate print data based on image data received from the application program and to send the generated print data to printer 200.

Status monitor 120 (an example of a notification application) may be configured to receive error information sent from printer 200 and display detailed information corresponding to the error information, e.g., at least one of details of an error that has occurred and a recovery procedure for the error, on a display of PC 100. Status monitor 120 may be configured to start when PC 100 boots up, and may stay resident while the PC 100 is running Status monitor 120 may be configured to be forcefully ended by a user operation.

Printer 200 (an example of an image forming apparatus) may be equipped with firmware 210 for controlling each unit or each portion of printer 200. Firmware 210 may be configured to display error information on an operating panel of printer 200 or send error information to PC 100, in accordance with an error type, when an error occurs in printer 200.

Printer 200 may be configured to perform wireless communication with a mobile information terminal 500. Mobile information terminal 500 may be, for example, a mobile phone or a tablet computer. When an error occurs in printer 200, firmware 210 may send error information to mobile information terminal 500 as necessary.

The number of printers 200 and PCs 100 provided in image forming system 900 is not limited to numbers of printers 200 and PCs 100 shown and/or described in the specific embodiment. Other types of information processing devices or other types of image processing devices may be present and connected with each other in image forming system 900.

Figure 2:
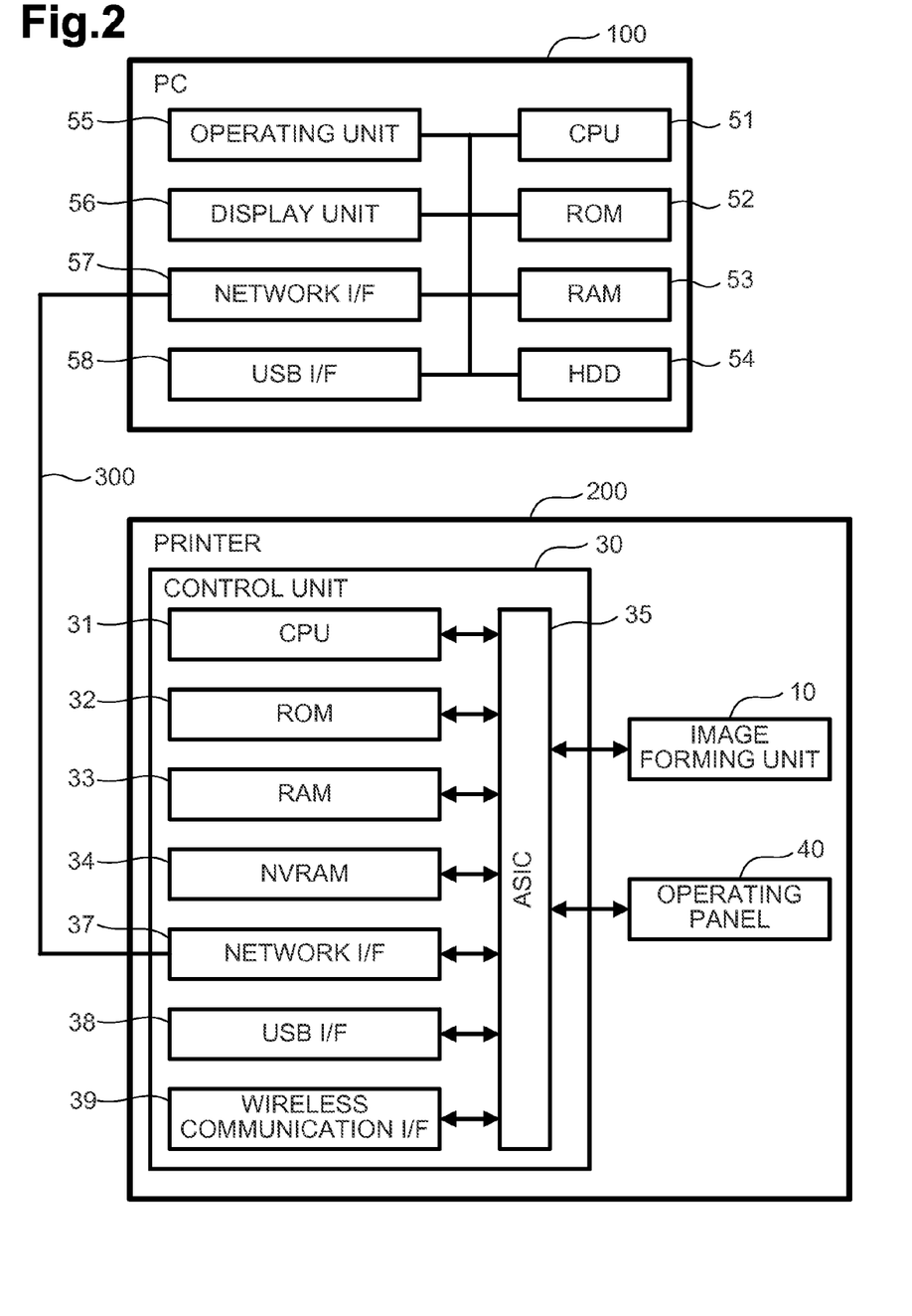
FIG. 2 is a block diagram depicting an example electric configuration of a computer and a printer in the image forming system of FIG. 1 in the first embodiment according to one or more aspects of the disclosure.

A schematic configuration of PC 100 is described below. As depicted in FIG. 2, PC 100 may comprise a central processing unit ("CPU") 51, a read-only memory ("ROM") 52, a random-access memory ("RAM") 53, a hard disk drive ("HDD") 54, an operating unit 55, a display unit 56, a network interface ("I/F") 57, and a Universal Serial Bus ("USB") interface ("I/F") 58. Operating unit 55 may comprise one or both of, e.g., a keyboard and a mouse. Display unit 56 may comprise, e.g., a liquid crystal display.

For example, an operating system ("OS"), device drivers for controlling various devices, and application programs having a printing instructing function, e.g., a word processing package and a spreadsheet package, may be installed on HDD 54 of PC 100. Printer driver 110 and status monitor 120 may be also installed on HDD 54.

CPU 51 may be configured to perform various processes in PC 100. Further, CPU 51 may be configured to store processing results in RAM 53 or HDD 54, in accordance with the control programs read from ROM 52 and the application programs read from HDD 54. The functions of printer driver 110 and status monitor 120 are processed by CPU 51.

The network interface 57 and the USB interface 58 may be configured to allow PC 100 to communicate with an external device. In this embodiment, PC 100 may be configured to perform data communication with printer 200 or server 400 via network interface 57.

A schematic configuration of printer 2 is described below. As depicted in FIG. 2, printer 200 may comprise an image forming unit 10, an operating panel 40, and a control unit 30. Image forming unit 10 may be configured to print an image onto a sheet. Operating panel 40 may be configured to display the operating status of printer 200 and accept user input. Control unit 30 may comprise a CPU 31, a ROM 32, a RAM 33, a nonvolatile RAM ("NVRAM") 34, an application-specific integrated circuit ("ASIC") 35, a network interface ("I/F") 37, a USB I/F 38, and a wireless communication I/F 39.

Control unit 30 may be electrically connected with image forming unit 10 and operating panel 40.

ROM 32 may be configured to store firmware 210, which may comprise control programs for controlling printer 200, various settings, as well as certain initial values, for example. RAM 33 may be used as a work area for storing various control programs read from ROM 32 or as a storage area for temporarily storing image data.

CPU 31 (an example of a control device) may be configured to control each unit or portion of printer 200 via ASIC 35. Further, CPU 31 may be configured to store processing results in RAM 33 or NVRAM 34, in accordance with the control programs read from ROM 32 and signals sent from various sensors. The functions of firmware 210 may be processed by CPU 31.

The network interface 37 (an example of a receiving unit or a sending unit), USB interface 38, and wireless communication interface 39 may be configured to allow printer 200 to perform communication with an external device. In this embodiment, printer 200 may perform data communication with PC 100 or sever 400 via network interface 37. Printer 200 may be configured to perform data communication with mobile information terminal 500 via wireless communication interface 39.

Image forming unit 10 (an example of an error information printing unit) may be configured to print an image onto a sheet. An image forming method of image forming unit 10 may be an electrophotographic type or an inkjet type.

Operating panel 40 (an example of an accepting unit) may comprise various buttons, through which an user input may be accepted, and a liquid crystal display (LCD), which may be configured to display textual information. The LCD may be configured to be attachable to and detachable from operating panel 40. While the LCD is separated from the operating panel 40, the LCD may be configured to perform wireless communication with image forming unit 10 and display error information when the LCD is within a location where the LCD can perform wireless communication with image forming unit 10. The various buttons may comprise, for example, a button for instructing execution of a printing operation, and a cancel button for instructing a cancellation of a printing operation. In this embodiment, operating panel 40 may further comprise a printing forced-start button for instructing execution of a printing operation of pending print data.

Figure 3:
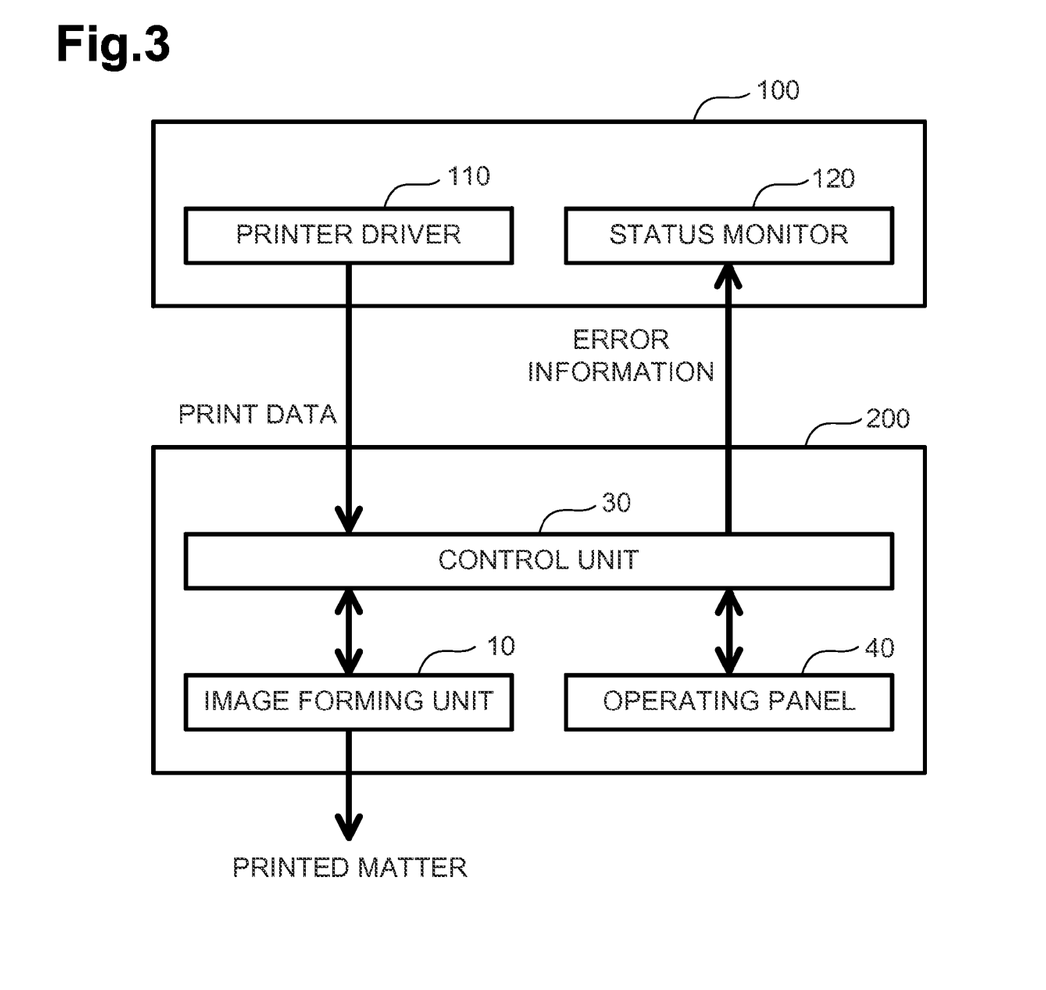
FIG. 3 is a schematic block diagram of the image forming system of FIG. 1 in the first embodiment according to one or more aspects of the disclosure.

An overview of image forming system 900 is described with reference to FIG. 3.

In image forming system 900, printer driver 110 of PC 100 may send print data to printer 200. Printer 200, upon receiving the print data, may then start a printing operation of the print data by image forming unit 10 and output a printed matter.

When an error that aborts the printing operation occurs, printer 200 may send error information to a destination device. Printer 200 may select a destination device, to which the error information is sent, in accordance with, e.g., details of the error, the operating status of printer 200, and details of the print data. In this embodiment, the destination device may be one of operating panel 40 and an external device. Operating panel 40 may notify the user of the error information by displaying textual information or by illuminating or flashing one or more LED lamps. The external device may notify the user of the error information through an application program installed on the external device.

The external device may be PC 100 configured as a source device of the print data. That is, the source device of the print data and the destination device to which the error information is sent may be the same device. For example, a user who made a request to print data may want to obtain a printed matter of the data immediately and want to obtain details of an error.

When another user, e.g., an administrator, other than the user who sent the print data, needs to confirm the error information, printer 200 may send the error information to server 400 or mobile information terminal 500 of the other user. In this embodiment, as a rule, printer 200 may be configured to send the error information to PC 100 that is the source of the print data and status monitor 120 of PC 100 is configured to notify the user of the error information.

When printer 200 receives the print data, and before starting a printing operation with respect to the print data, printer 200 may determine whether the destination device is available to receive and/or provide notification to the user of error information. Printer 200 may then start a printing operation with respect to the print data on condition that the destination device is available to receive and/or provide notification to the user of the error information.

A procedure of a printing-start determining process (an example of a print restriction control process, or the error information printing unit) for controlling printing in printer 200 is now described with reference to FIG. 4. The printing-start determining process is performed by CPU 31 of printer 200 when printer 200 has received print data. In the following description, the source device of print data and the destination device of error information may both be the same device, e.g., PC 100.

In the printing-start determining process according to the first embodiment, CPU 31 may determine whether error information needs to be sent to the external device, e.g., PC 100 (step S100). Hereinafter, description is made with PC 100 corresponding to the external device.

In step S100, CPU 31 may determine whether an error of which the user needs to be notified on PC 100 (hereinafter, referred to as a specific error) may occur by checking the error against check points in accordance with e.g., details of the print data, device-specific information, and an operating status of PC 100. The check points may be prestored in ROM 32. CPU 31 may determine the need for sending the error information to the PC 100 with respect to each of the check points. A case where a specific error may occur may comprise a case where a specific error will surely occur (e.g., 100% probability of occurrence) and a case where a specific error will rarely occur (e.g., 5% probability of occurrence).

In one example of the check points in step S100, CPU 31 may determine whether the received print data applies to the specific print data, e.g., data for double-sided printing or data for staple printing. For example, when an error occurs during double-sided printing, it may be difficult to indicate briefly a recovery procedure for the error. The reason may be that it may need to indicate a complicated recovery procedure for the error. For example, it may need to describe, as the recovery procedure, a position where the error has occurred in a sheet conveying path which may comprise a sheet conveying path for printing one side of a sheet and a sheet conveying path for printing the other side of the sheet and a procedure for restarting the double-sided printing operation. Therefore, when the received print data is for the double-sided printing, CPU 31 may determine that a specific error may occur. As described above, CPU 31 may determine whether a specific error may or will occur based on the details of the print data.

According to another example of the check points in step S100, CPU 31 may determine whether a limit function, e.g., user limit or page limit, is effective (e.g., to be enforced). That is, when a device-specific error, e.g., print permission on a user basis or page limit on a user basis, occurs, it may be difficult to indicate error information briefly. The reason may be that it may need to indicate a reason why printing is not allowed and/or how to remove the restrictions. Therefore, when a device-specific error is effective, CPU 31 may determine that a specific error may occur. As described above, CPU 31 may determine whether a specific error may or will occur based on the setting of the device-specific function.

According to still another example of the check points in step S100, CPU 31 may determine whether an error-log sending function is effective (e.g., to be enforced). When an error log is recorded on PC 100 with respect to a predetermined error, it may be difficult to indicate briefly the error information. The reason may be that it may need to indicate complicated information, e.g., a communication status between PC 100 and printer 200 and an action to restore access to PC 100. Therefore, when the error-log sending function is effective, CPU 31 may determine that a specific error may occur. As described above, CPU 31 may determine whether a specific error will or may occur based on the setting for handling of the error.

Yet another example of the check points in step S100 may include CPU 31 determining whether the LCD is mounted on operating panel 40. In printer 200, the LCD may be detachable from operating panel 40. The LCD may be configured to receive error information by wireless communication while being separated from operating panel 40. Therefore, when the LCD is not placed on operating panel 40, the LCD may not display the error information due to a communication error, and some action may need to be taken to notify the user of the error information. Accordingly, when the LCD is separated from operating panel 40, CPU 31 may determine that a specific error may occur. As described above, CPU 31 may determine whether a specific error may or will occur based on the status of printer 200. In other cases, e.g., when CPU 31 has detected that toner is nearly empty, a complicated action, e.g., replacement of a toner cartridge, may need to be performed. Therefore, when CPU 31 has detected that toner is nearly empty, CPU 31 may determine that a specific error may or will occur.

That is, in step S100, CPU 31 may determine the possibility of occurrence of a specific error with respect to at least one of the check points, e.g., the presence or absence of the LCD on operating panel 40, the presence or absence of the detection that toner is nearly empty, the presence or absence of the setting of the limit function, e.g., user limit or page limit, or the presence or absence of specific print data, e.g., data for double-sided printing or data for staple printing, in which a recovery procedure for an error occurred in the print data may be complicated. When there is at least one check point in which a specific error may or will occur with respect to the received print data, CPU 31 may determine that error information needs to be notified the user on PC 100. Accordingly, in one or more arrangements, errors notifications may be provided/notified to the user in advance of the error occurring.

When there is no check point of which error information needs to be notified to the user on PC 100 and CPU 31 determines that error information need not be sent to PC 100 (step S100:NO), the routine moves to step S103 and CPU 31 may start a printing operation for the print data.

When CPU 31 determines that error information needs to be sent to PC 100 (step S100:YES), CPU 31 may perform a notification-availability checking process for determining whether PC 100 (an example of the external device) is available to notify the user of the error information (step S101). A procedure of the notification-availability checking process is now described with reference to FIG. 5.

Figure 5:
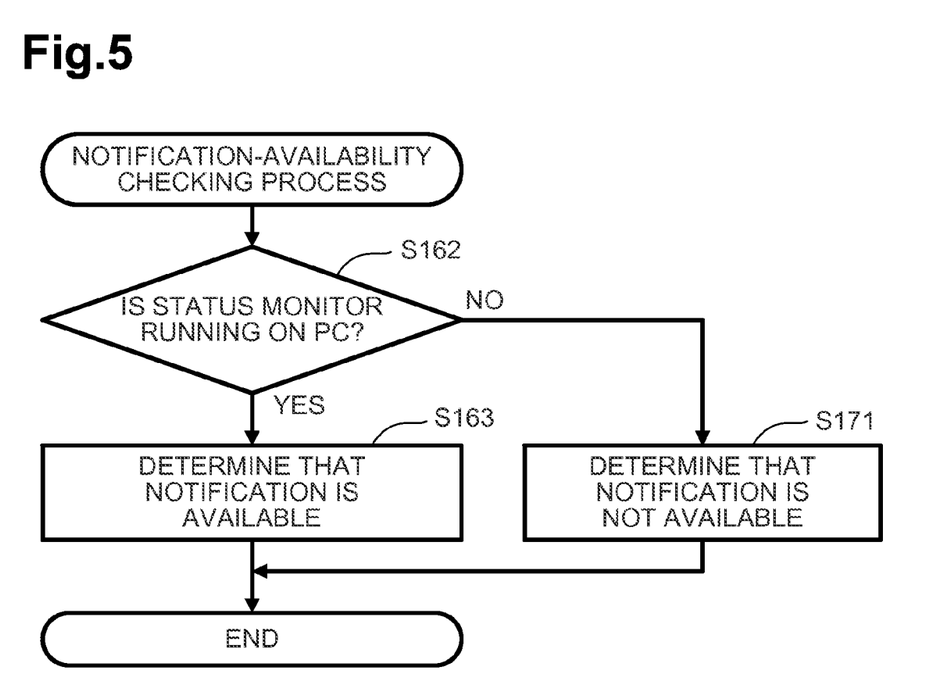
FIG. 5 is a flowchart depicting an example notification-availability checking process in the first embodiment according to one or more aspects of the disclosure.

In the notification-availability checking process, CPU 31 may determine whether status monitor 120 is running on PC 100 (step S162). In step S162, for example, printer 200 may directly inquire of PC 100 about whether status monitor 120 is running. When status monitor 120 is running on PC 100, status monitor 120 may receive the inquiry from printer 200 and send a response to printer 200 with a signal indicating that status monitor 120 is running Printer 200 may determine that status monitor 120 is running by receipt of the response signal from PC 100 (e.g., from the status monitor 120 running thereon). When status monitor 120 is not running on PC 100, printer 200 may not receive a response signal to the inquiry from status monitor 120. Therefore, CPU 31 may determine that status monitor 120 is not running on the PC 100 when printer 200 does not received a response from status monitor 120 until a predetermined time has elapsed since printer 200 made the inquiry.

Figure 6:
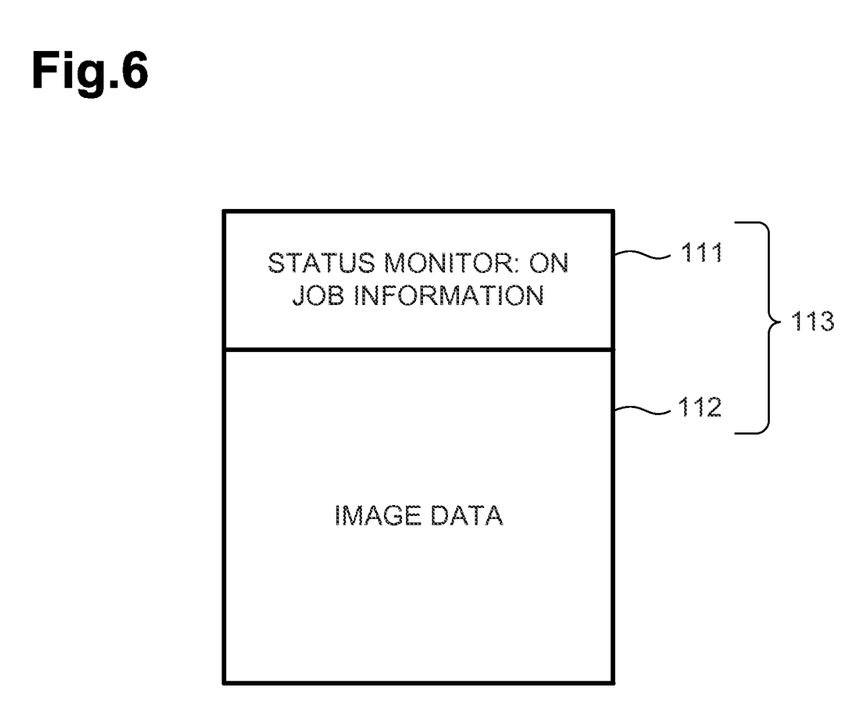
FIG. 6 illustrates an example configuration of print data sent from the computer to the printer in the first embodiment according to one or more aspects of the disclosure.

In step S162, printer 200 may not directly inquire of status monitor 120 about the running status. For example, printer driver 110 of PC 100 may generate print data accompanied with the running status of status monitor 120 and provide the information to the printer 200 (e.g., without prompting/inquiry). As depicted in FIG. 6, print data 113 may comprise a header area 111, in which job information, e.g., resolution or address information, may be stored, and an image data area 112, in which image data may be stored. In this case, information related to the running state of status monitor 120 may be stored in header area 111 of print data 113 (an example of a generating unit). Upon receipt of print data 113, CPU 31 may determine whether status monitor 120 is running on PC 100 with reference to header area 111 of print data 113, in printer 200.

When CPU 31 determines that status monitor 120 is running on PC 100 (step S162:YES), error information may be notified to the user through status monitor 120 when an error occurs, will occur and/or may occur. Thus, CPU 31 may determine that the notification is available (e.g., receivable and/or able to be provided) on PC 100 (step S163) and end the notification-availability checking process.

When CPU 31 determines that status monitor 120 is not running on PC 100 (step S162:NO), error information may not be notified to the user and/or PC 100 when an error occurs. Thus, CPU 31 may determine that the notification is not available (e.g., receivable and/or able to be provided) on PC 100 (step S171) and end the notification-availability checking process.

Figure 4:
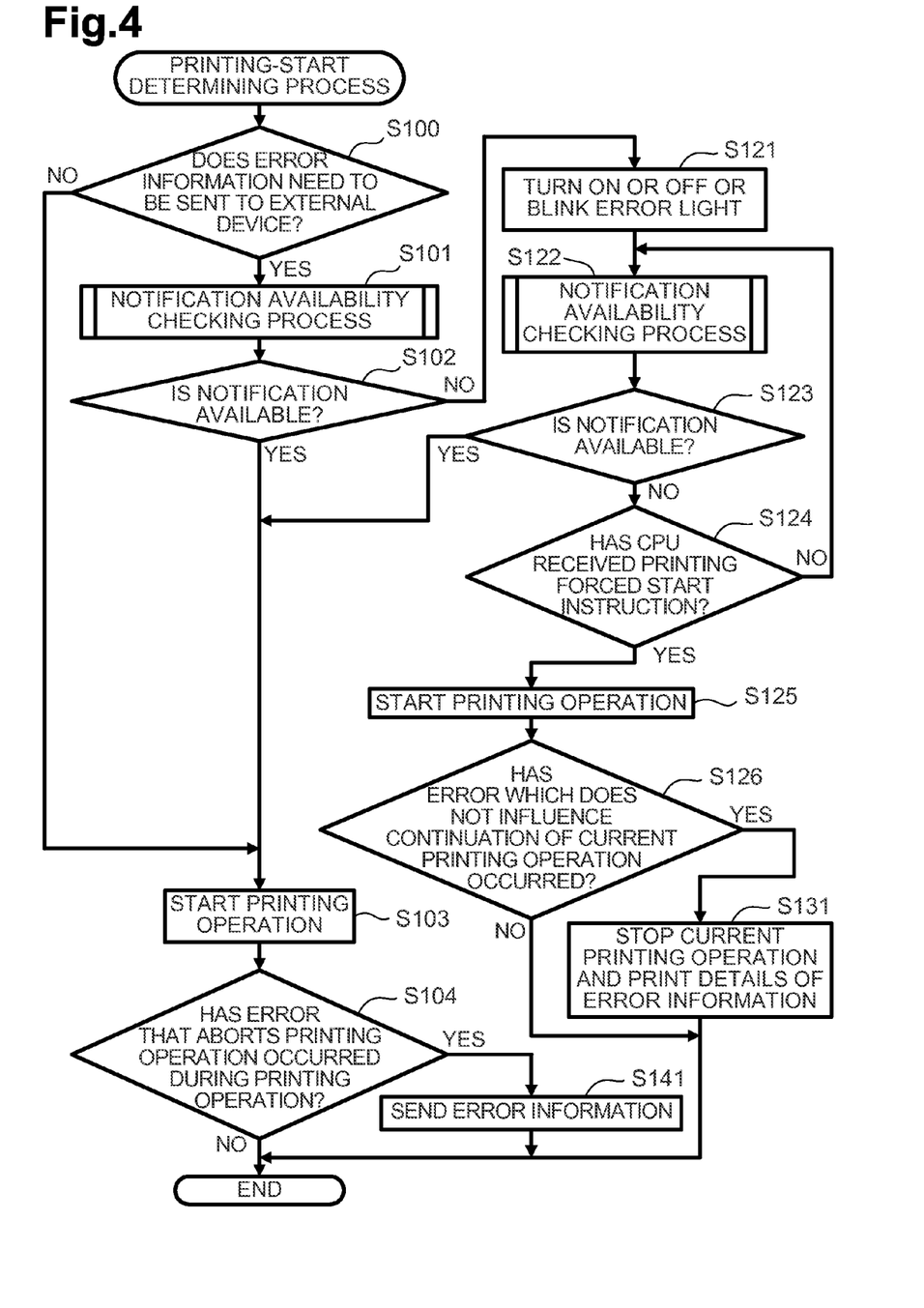
FIG. 4 is a flowchart depicting an example printing-start determining process performed in the first embodiment according to one or more aspects of the disclosure.

Referring again to the description of the printing-start determining process depicted in FIG. 4, CPU 31 may determine whether the notification is available, based on the result of the notification-availability checking process of step S101 (step S102) (an example of the print restriction control). When CPU 31 determines that the notification is available (step S102:YES), CPU 31 may start a printing operation of the received print data (step S103).

Then, CPU 31 may determine whether an error that aborts the printing operation has occurred during the printing operation (step S104). When such an error has not occurred (step S104:NO), CPU 31 may end the printing-start determining process. When such an error has occurred (step S104:YES), CPU 30 may send error information to either or both of operating panel 40 and PC 100 depending on the type of the error (step S141). After step S141, CPU 31 may end the printing-start determining process.

When CPU 31 determines that the notification is not available (step S102:NO), CPU 31 may turn on or off or blink an error light on operating panel 40 (step S121). By doing so, printer 200 may notify the user that printer 200 cannot perform a printing operation of the received print data. The turning on or off or blinking of the error light may refer to the prohibition of the execution of a printing operation because printer 200 is not able to send error information to PC 100 when a specific error occurs. In some examples, the definition of the turning on or off or blinking of the error light may be indicated in a manual or other instruction information. In one example, the definition of the turning on or off or blinking of the error light may be displayed on the LCD of operating panel 40.

Then, CPU 31 may perform the notification-availability checking process (step S122). The notification-availability checking process of step S122 may be the same as the notification-availability checking process of step S101. Subsequently, CPU 31 may determine whether the notification is available, based on the result of the notification-availability checking process of step S122 (step S123). When the CPU 31 determines that the notification is available (step S123:YES), the routine may move to step S103 and CPU 31 may start a printing operation of the received print data (step S103).

When CPU 31 determines that the notification is not available (step S123:NO), CPU 31 may determine whether CPU 31 has received a forced-printing instruction from the user (step S124). More specifically, CPU 31 may determine whether a printing forced-start button of operating panel 40 has been pressed. When CPU 31 has not received a forced-printing instruction (step S124:NO), the routine may move to step S122 and CPU 31 may again perform the notification-availability checking process.

When CPU 31 has received a forced-printing instruction (step S124:YES), CPU 31 may start a printing operation of the received print data (step S125). Then, CPU 31 may determine whether a specific error, which may not influence the continuation of the current printing operation, has occurred during the printing operation (step S126). When such a specific error has not occurred (step S126:NO), CPU 31 may end the printing-start determining process. When such a specific error has occurred (step S126:YES), CPU 31 may stop the current printing operation of the print data and print details of error information of the specific error (step S131). That is, printer 200 may be configured to use a sheet for the error notification only when printer 200 received the forced-printing instruction in a condition where a printing operation should not be performed. Generally, printer 200 may be configured to notify the user of occurrence of an error without using a sheet. However, when the user provides the printing instruction to printer 200 at user's own risk (e.g., when notification is not available through the external device such as PC 100), printer 200 may be configured to notify the user of occurrence of an error by using a sheet. With this configuration, CPU 31 may end the printing-start determining process after notifying the user of the details of the error information of the error. After step S131, CPU 31 may end the printing-start determining process.

In this embodiment, after CPU 31 determines that the notification is not available in step S102, CPU 31 may repeatedly perform steps S122 to S124 until CPU 31 determines that the notification is available or until CPU 31 determines that CPU 31 has received the forced-printing instruction. In other embodiments, for example, a timer, which may be configured to start running on the turning on or off or blinking of the error light, may be provided. In this case, when the timer exceeds a predetermined time, CPU 31 may forcefully end the printing-start determining process without starting the printing operation. That is, printer 200 may abandon the received print data.

Figure 7:
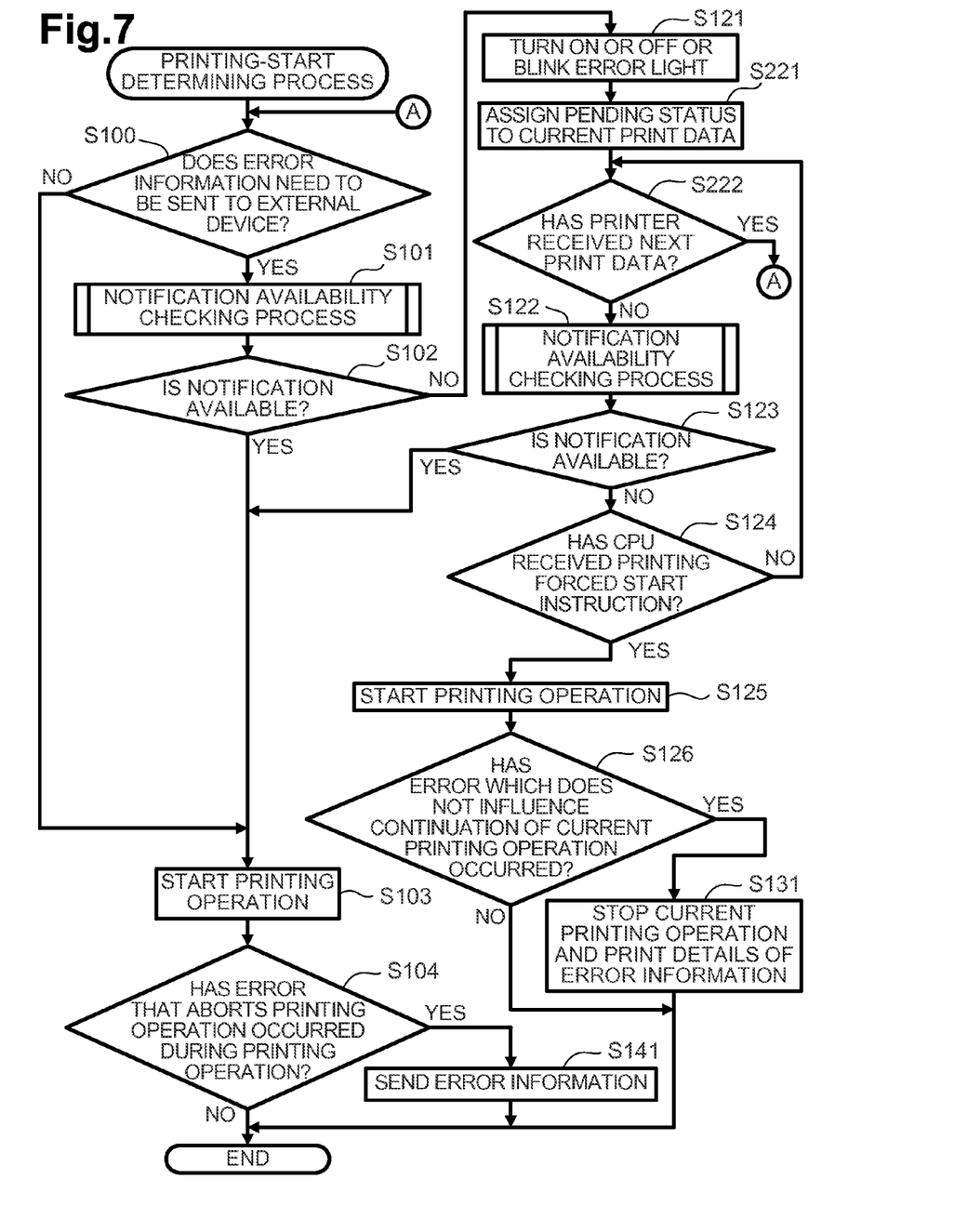
FIG. 7 is a flowchart depicting an example printing-start determining process performed in a printer in a second embodiment according to one or more aspects of the disclosure.

A procedure of a printing-start determining process according to a second embodiment of one or more aspects of the disclosure is described below with reference to FIG. 7. In the printing-start determining processing, when printer 200 receives a next print data after CPU 31 had determined that the notification is not available, CPU 31 may postpone a printing operation of the print data of which the notification is not available and perform processing on the next (e.g., subsequently received) print data. This aspect may be different from the first embodiment in which the next print data might not be processed until the notification becomes available for the previously received print data on PC 100 or until the forced-printing instruction is provided. In the second embodiment, an explanation is provided for the different parts, and an explanation will be omitted for the common parts by assigning the same reference numerals thereto.

CPU 31 may determine whether error information needs to be sent to PC 100 (step S100). When CPU 31 determines that error information needs to be sent to PC 100 (step S100:YES), CPU 31 may perform the notification-availability checking process for determining whether PC 100 is available to notify the user of the error information (step S101). Then, CPU 31 may determine whether the notification is available (e.g., receivable by and/or able to be provided to a user through a notification device), based on the result of the notification-availability checking process of step S101 (step S102).

When CPU 31 determines that the notification is not available (step S102:NO), CPU 31 may turn on or off or blink the error light on operating panel 40 (step S121). Then, CPU 31 may assign a pending status to the current print data (step S221). The pending status may refer to a state where the print data stays in a print-standby status until printer 200 receives a printing start instruction. A buffer area, in which the print data in the pending status may be stored, may be allocated in RAM 33 or in NVRAM 34 of printer 200. The print data turned into the pending status may be stored in the buffer area. A memory area for printing may be used for printing of the next print data.

Then, CPU 31 may determine whether printer 200 has received the next print data (step S222). When printer 200 has received the next print data (step S222:YES), the routine may move to step S100. After that, when CPU 31 determines that error information does not need to be sent to PC 100 (step S100:NO) for the next print data or when error information needs to be sent to PC 100 (step S100:YES) and CPU 31 determines that the notification is available (step S102:YES) for the next print data, CPU 31 may start a printing operation of the next print data while keeping the previous print data in the pending status.

When printer 200 has not received the next print data (step S222:NO), CPU 31 may again perform the notification-availability checking process on the pending (previous) print data (step S122). In the notification-availability checking process of step S122, when one or more pending print data exist, CPU 31 may determine whether the notification is available on PC 100 with respect to the one or more pending print data. After that, CPU 31 may determine whether the notification is available, based on the result of the notification-availability checking process of step S122 (step S123). When there is print data whose error information becomes available to be notified on PC 100 (step S123:YES), CPU 31 may start a printing operation with respect to the print data.

When CPU 31 determines that the notification is not available (step S123:NO), the routine may move to step S124. CPU 31 may perform the same processing as CPU 31 performs in the printing-start determining process according to the first embodiment, in step S124 and the steps subsequent to step S124, in the steps subsequent to step S102 when a positive determination is made in step S102, or in the steps subsequent to step S100 when a negative determination is made in step S100.

In the second embodiment, CPU 31 may start a printing operation of the pending print data, of which printing operation was postponed, when CPU 31 receives the forced-printing instruction. In another case, CPU 31 may determine whether the notification becomes available with respect to the one or more pending print data at the time of (e.g., upon or in response to) receiving the next print data. When CPU 31 determines that the notification becomes available with respect to the one or more pending print data, CPU 31 may start a printing operation of the one or more pending print data.

Figure 8:
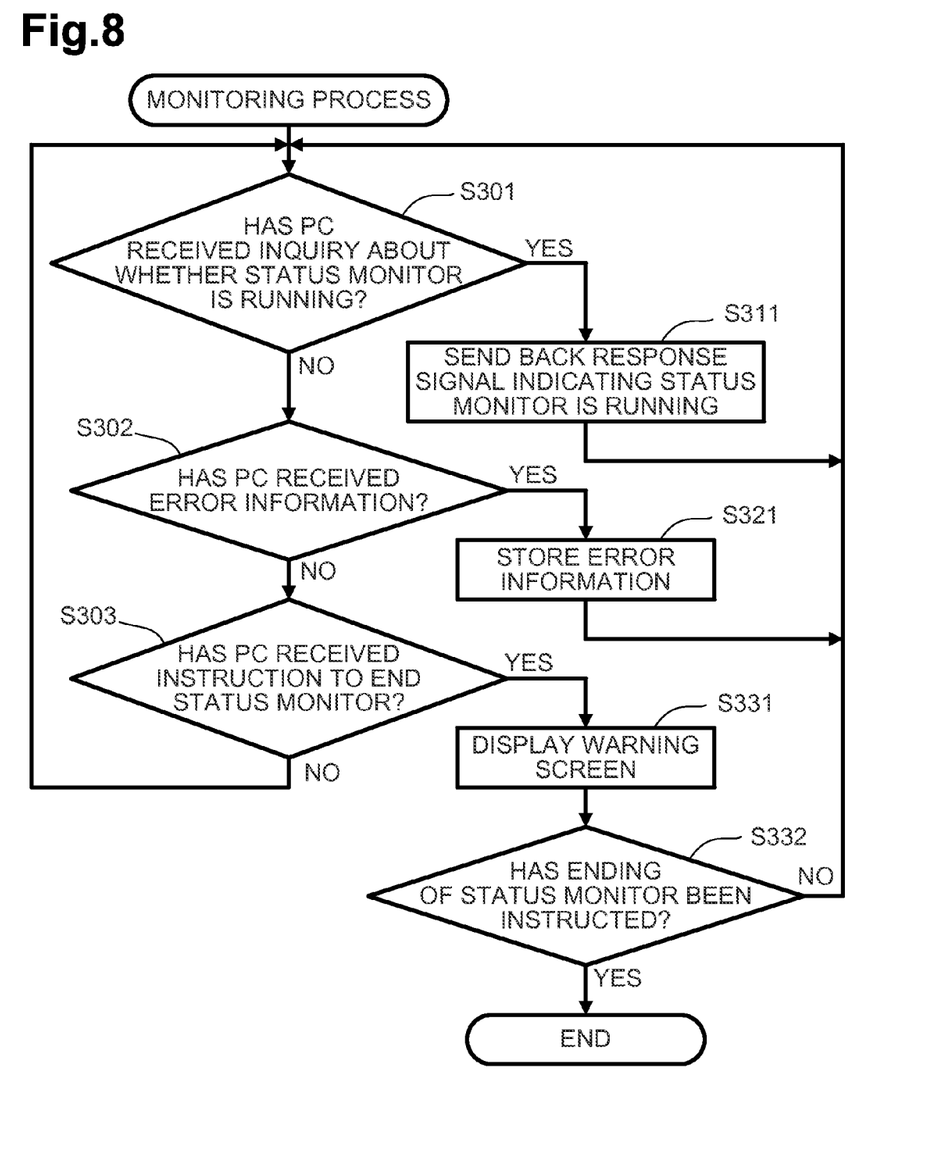
FIG. 8 is a flowchart depicting an example monitoring process in a status monitor on the computer in the first embodiment according to one or more aspects of the disclosure.

A procedure of a monitoring process, which may be a function of status monitor 120 of PC 100, is now described with reference to FIG. 8. The monitoring process may be performed by CPU 51 of PC 100 when status monitor 120 is up and running.

CPU 51 may determine whether PC 100 has received an inquiry from printer 200 about whether status monitor 120 is running (step S301). Printer 200 may issue the inquiry in step S101 of the printing-start determining process or in step S122 of the notification-availability checking process. When PC 51 has received the inquiry from printer 200 (step S301:YES), CPU 51 may send back a response to printer 200 with a signal indicating that status monitor 120 is running (step S311). After step S311, the routine may move to step S301.

When PC 100 has not received the inquiry from printer 200 (step S301:NO), CPU 51 may determine whether PC 100 has received error information from printer 200 (step S302). When PC 100 has received the error information from printer 200 (step S302:YES), CPU 51 may store the received error information in status monitor 120 (step S321). On the storing of the error information, status monitor 120 may automatically update information that is being displayed. When status monitor 120 is running but is not visible, status monitor 120 may show up (e.g., be displayed in a foreground and/or receive primary focus on the display) upon the storing of the error information. With this configuration, the user may notice the addition of the new error information. After step S321, the routine may move to step S310.

When PC 100 has not received error information from printer 200 (step S302:NO), CPU 51 may determine whether PC 100 has received an instruction to end status monitor 120 (step S303). When PC 100 has not received the instruction (step S303:NO), the routine may move to step S301.

Figure 9:
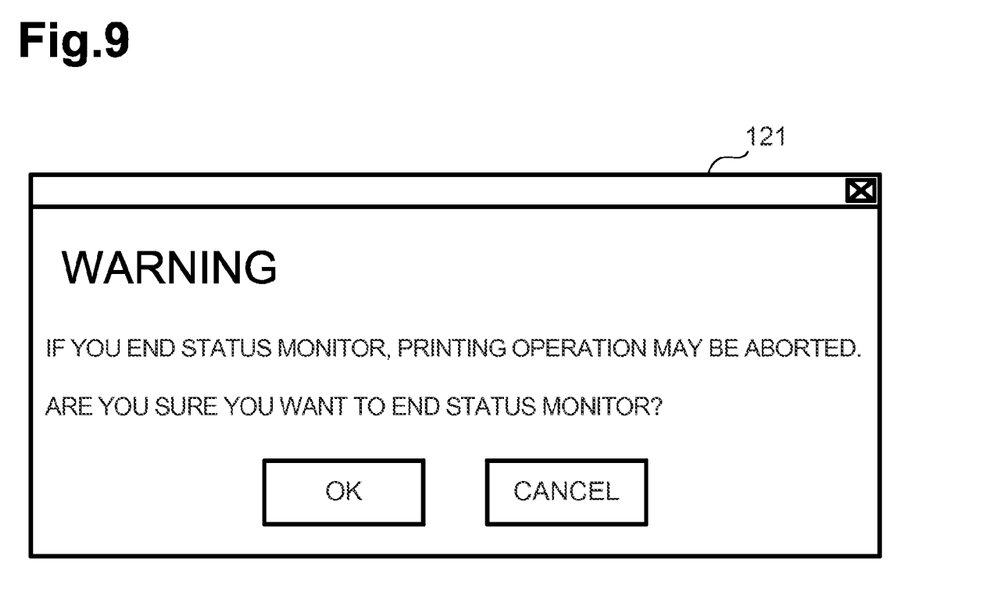
FIG. 9 illustrates an example warning screen that is generated and/or provided when an instruction to end the status monitor is provided in the first embodiment according to one or more aspects of the disclosure.

When PC 100 has received the instruction to end status monitor 120 (step S303:YES), CPU 51 may display a warning screen 121 as depicted in FIG. 9 (step S331). That is, if status monitor 120 is forcefully ended by a user operation, the user may get disadvantages, e.g., details of an error may be unknown to the user or a printing operation may be prohibited. Therefore, when PC 100 received the forced-end instruction, CPU 51 may display warning screen 121 showing a message indicating that the user may get disadvantages if the status monitor 120 is ended.

After step S331, CPU 51 may determine whether the ending of status monitor 120 has been instructed on warning screen 121 (step S332). When a "CANCEL" button has been selected (step S332:NO), the routine may move to step S301. When an "OK" button has been selected (step S332:YES), CPU 51 may end the monitoring process.

As described above, printer 200 according to the above-described embodiments, CPU 31 may determine whether PC 100 is available to notify the user of error information. When CPU 31 determines that PC 100 is available to notify the user of error information, printer 200 may start a printing operation of the received print data. When CPU 31 determines that PC 100 is not available to notify the user of error information, printer 200 may not start a printing operation of the received print data until PC 100 becomes available to notify the user of error information or printer 200 receives the forced-printing instruction. That is, in image forming system 900, a printing operation may be started on condition that PC 100 is available to notify the user of error information. With this configuration, when an error occurs, the error information may be notified to the user with more certainty, thereby reducing the risk of being unnoticed by the user. As a result, printer 200 may recover from the error immediately and keep its productivity when an error occurs.

Various changes, arrangements and modifications may be applied. For example, the printer may have at least a printing function. Therefore, features described herein may also be applied to a multifunction peripheral or a copying machine. The information processing device configured to send print data to the printer may not be limited to the PC, but also may be, for example, a mobile information terminal or a work station.

In the above-described embodiments, the source device of print data and the destination device to send error information may be the same device, e.g., PC 100. Nevertheless, in other embodiments, the source device and the destination device may be different devices. For example, in the image forming system 900 of FIG. 1, the source device of print data may be PC 100 and the destination device may be server 400 or mobile information terminal 500.

In the above-described embodiments, CPU 31 may determine whether the destination device is available to notify the user of error information by directly inquiring of the destination device or by reading information added to print data. Nevertheless, in other embodiments, for example, the destination device may be configured to receive an e-mail. In this case, printer 200 may send an e-mail to the destination device to check the running status of the destination device. When printer 200 succeeded in sending the e-mail, CPU 31 may determine that the destination device is available to notify the user of error information. When printer 200 failed in sending the e-mail, CPU 31 may determine that the destination device is not available to notify the user of error information.

A mobile information terminal configured to perform Wi-Fi® communication may serve as the destination device and the information processing device for sending print data. In this case, CPU 31 may determine whether printer 200 has received an inquiry about the performance capability of printer 200 from the mobile information terminal within a certain time period until printer 200 receives print data. When printer 200 has received the inquiry, CPU 31 may determine that the destination device is available to notify the user of error information. When printer 200 has not received the inquiry, CPU 31 may determine that the destination device is not available to notify the user of error information.

In the second embodiment, when PC 100 is not available to notify the user of error information, CPU 31 may postpone a printing operation of the current print data and place the current print data into the print-standby status. Nevertheless, in other embodiments, for example, when PC 100 is not available to notify the user of error information, CPU 31 may erase the current print data from the memory and end the printing-start determining process.

In the above-described embodiments, in the notification-availability checking process, CPU 31 may determine whether error information needs to be sent to PC 100 in step S100. When CPU 31 determines that error information does not need to be sent to PC 100, CPU 31 may determine that PC 100 is available to notify the user of error information. Nevertheless, in other embodiments, step S100 may be omitted. That is, CPU 31 may determine the notification-availability on PC 100, without performing step S100, based on the results of the determination of step S101 in which the determination may be made as to whether status monitor 120 is running.

In the above-described embodiments, operating panel 40 may be configured such that the LCD is attachable thereto and detachable therefrom. Nevertheless, in other embodiments, for example, the LCD may be fixed to operating panel 40. In the above-described embodiments, printer 200 may comprise the LCD. Nevertheless, in other embodiments, for example, printer 200 may not comprise the LCD, i.e., printer 200 may not have a text displaying function. However, it may be difficult to indicate complicated error information in printer 200 that does not have the text displaying function. Therefore, printer 200 that does not have the text displaying function needs to send error information to PC 100 to notify the user of it. Accordingly, such a printer 200 may be suitable for the one or more aspects of the disclosure.

What is claimed is:

1. An image forming system comprising an image forming apparatus, an information processing device configured to send print data to the image forming apparatus, and a destination device configured to receive error information sent from the image forming apparatus,
    the image forming apparatus comprising a control device configured to:
       determine whether the destination device is available to notify of the error information; and
       perform a print restriction control in such a manner as to start a printing operation of the print data received from the information processing device when the destination device is available to notify of the error information and to not start the printing operation of the print data when the destination device is not available to notify of the error information.

2. The image forming system according to claim 1, wherein the information processing device serves as the destination device to which the error information is sent.

3. The image forming system according to claim 1, wherein an error that occurs in the image forming apparatus comprises a specific error that needs to be notified on the destination device and another error other than the specific error, and
    wherein the control device is further configured to:
       determine whether the print data is to cause the specific error while the image forming apparatus performs the printing operation of the print data;
       perform the print restriction control when the print data is to cause the specific error; and
       perform the printing operation of the print data without performing the print restriction control when the print data is not to cause the specific error.

4. The image forming system according to claim 3, wherein the control device is configured to determine whether the print data is to cause the specific error based on details of the print data.

5. The image forming system according to claim 3, wherein the specific error is notified on the destination device, as the error information.

6. The image forming system according to claim 1, wherein the control device is further configured to prohibit the printing operation of the print data by assigning a pending status to the print data, thereby postponing the printing operation of the print data.

7. The image forming system according to claim 6, wherein the control device is further configured to perform the printing operation of the print data in the pending status when the destination device is available to notify of the error information as a result of a redetermination as to the availability of the destination device to notify of the error information.

8. The image forming system according to claim 6, wherein the image forming apparatus further comprises an accepting unit configured to accept a printing instruction to perform the printing operation of the print data in the pending status by a user input.

9. The image forming system according to claim 8, wherein the image forming apparatus further comprises an error information printing unit configured to print the error information corresponding to an occurred error when the error has occurred during the printing operation of the print data, after staring the printing operation of the print data in accordance with the printing instruction accepted by the accepting unit.

10. The image forming system according to claim 1, wherein the destination device is equipped with a notification application that is a program for notifying of the error information, and
    wherein the control device is further configured to:
       determine that the destination device is available to notify of the error information when the notification application is running on the destination device; and
       determine that the destination device is not available to notify of the error information when the notification application is not running on the destination device.

11. The image forming system according to claim 10, wherein the information processing device further comprises a generating unit configured to generate the print data, the print data associated with running information indicating a running status of the notification application, and
    wherein the control device is further configured to determine whether the notification application is running based on the running information.

12. The image forming system according to claim 10, wherein the control device is further configured to:
    inquire of the destination device as to whether the notification application is running; and
    determine whether the notification application is running based on a response to the inquiry from the destination device.

13. The image forming system according to claim 10, wherein the notification application is configured to issue a warning that the printing operation may be limited in the image forming apparatus before the notification application ends.

14. The image forming system according to claim 1, wherein the image forming apparatus does not have a text displaying function.

15. An image forming apparatus comprising:
    a receiving unit configured to receive print data;
    a sending unit configured to send error information to a destination device; and
    a control device configured to:
       determine whether the destination device is available to notify of the error information; and
       perform a print restriction control in such a manner as to start a printing operation of the print data received from an information processing device when the destination device is available to notify of the error information and to not start the printing operation of the print data when the destination device is not available to notify of the error information.

16. The image forming apparatus according to claim 15, wherein an error that occurs in the image forming apparatus comprises a specific error that needs to be notified on the destination device and another error other than the specific error, and
    wherein the control device is further configured to:
        determine whether the print data is to cause the specific error while the image forming apparatus performs the printing operation of the print data;
        perform the print restriction control when the print data is to cause the specific error; and
        perform the printing operation of the print data without performing the print restriction control when the print data is not to cause the specific error.

17. The image forming apparatus according to claim 15, wherein the control device is further configured to prohibit the printing operation of the print data by assigning a pending status to the print data, thereby postponing the printing operation of the print data.

18. The image forming apparatus according to claim 17, wherein the control device is further configured to perform the printing operation of the print data in the pending status when the destination device is available to notify of the error information as a result of a redetermination as to the availability of the destination device to notify of the error information.

19. The image forming apparatus according to claim 15, wherein the control device is further configured to:
    determine that the destination device is available to notify of the error information when a notification application is running on the destination device; and
    determine that the destination device is not available to notify the error information when the notification application is not running on the destination device, and
    wherein the notification application is installed on the destination device and is a program for notifying the error information.

\* \* \* \* \*